United States Patent
Bendlin et al.

(10) Patent No.: US 11,576,135 B2
(45) Date of Patent: *Feb. 7, 2023

(54) OVER THE AIR SYNCHRONIZATION BY MEANS OF A PROTOCOL IN A NEXT GENERATION WIRELESS NETWORK

(71) Applicant: AT&T Intellectual Property I, L.P., Atlanta, GA (US)

(72) Inventors: Ralf Bendlin, Cedar Park, TX (US); Arunabha Ghosh, Austin, TX (US); Xiaoyi Wang, Austin, TX (US); Thomas Novlan, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 223 days.

This patent is subject to a terminal disclaimer.

(21) Appl. No.: 17/030,583

(22) Filed: Sep. 24, 2020

(65) Prior Publication Data
US 2021/0014816 A1 Jan. 14, 2021

Related U.S. Application Data

(63) Continuation of application No. 16/101,917, filed on Aug. 13, 2018, now Pat. No. 10,820,290.

(51) Int. Cl.
*H04W 56/00* (2009.01)
*H04W 74/08* (2009.01)
(Continued)

(52) U.S. Cl.
CPC ...... *H04W 56/0015* (2013.01); *H04B 7/2693* (2013.01); *H04W 74/008* (2013.01);
(Continued)

(58) Field of Classification Search
CPC ............ H04B 7/2693; H04W 56/0015; H04W 74/008; H04W 74/0833; H04W 88/04; H04W 92/02
See application file for complete search history.

(56) References Cited

U.S. PATENT DOCUMENTS 6,014,376 A   1/2000  Abreu et al.
6,751,248 B1  6/2004  Tan
(Continued)

FOREIGN PATENT DOCUMENTS

EP       2369880 A1    8/2013
WO    2009/030292 A1  3/2009
(Continued)

OTHER PUBLICATIONS

Non Final office action received for U.S. Appl. No. 16/543,305 dated Dec. 31, 2020, 36 pages.
(Continued)

*Primary Examiner* — Rina C Pancholi
(74) *Attorney, Agent, or Firm* — Amin, Turocy & Watson, LLP

(57) ABSTRACT

An integrated access and backhaul network is provided with network nodes that can establish timing synchronization with any other network nodes. In an embodiment, network nodes in a multi-hop integrated access and backhaul network have a hop order of n, wherein n represents a number of hops from a node connected to the core network via a wired connection. In an embodiment, instead of using the network node with a hop order of 0 as the timing synchronization reference for over-the-air synchronization, any network node can use any other network node as a synchronization reference. A relay node can first establish a wireless link to said arbitrary node. Said wireless link is then used to synchronize the relay or IAB node using a Precision Time Protocol (PTP) implementation.

20 Claims, 10 Drawing Sheets

(51) Int. Cl.
*H04B 7/26* (2006.01)
*H04W 88/04* (2009.01)
*H04W 92/02* (2009.01)
*H04W 74/00* (2009.01)

(52) U.S. Cl.
CPC ....... *H04W 74/0833* (2013.01); *H04W 88/04* (2013.01); *H04W 92/02* (2013.01)

(56) References Cited

U.S. PATENT DOCUMENTS

| | | | |
|---|---|---|---|
| 8,040,870 | B1 | 10/2011 | Smidth et al. |
| 8,213,405 | B2 | 7/2012 | Horn et al. |
| 8,705,508 | B2 | 4/2014 | In et al. |
| 8,730,868 | B2 | 5/2014 | Kamada et al. |
| 8,811,238 | B2 | 8/2014 | Huang |
| 9,014,213 | B2 | 4/2015 | Yeh et al. |
| 9,544,863 | B2 | 1/2017 | Koorapaty et al. |
| 9,577,774 | B2 | 2/2017 | Zhang et al. |
| 9,654,242 | B2 | 5/2017 | Cao et al. |
| 9,713,110 | B2 | 7/2017 | Lu et al. |
| 9,749,972 | B2 | 8/2017 | Bin Sediq et al. |
| 2011/0170436 | A1 | 7/2011 | Doan et al. |
| 2012/0014312 | A1 | 1/2012 | Zhang et al. |
| 2012/0236765 | A1 | 9/2012 | Huang |
| 2012/0275501 | A1 | 11/2012 | Rotenstein |
| 2015/0181546 | A1 | 6/2015 | Freda et al. |
| 2015/0351063 | A1 | 12/2015 | Charbit et al. |
| 2016/0302165 | A1 | 10/2016 | Da et al. |
| 2016/0366657 | A1 | 12/2016 | Farkas et al. |
| 2017/0064661 | A1 | 3/2017 | Katagiri et al. |
| 2017/0064731 | A1 | 3/2017 | Wang et al. |
| 2017/0150464 | A1 | 5/2017 | Kazehaya et al. |
| 2017/0223651 | A1 | 8/2017 | Patel et al. |
| 2017/0366287 | A1 | 12/2017 | Zeng et al. |
| 2019/0109745 | A1 | 4/2019 | Abedini et al. |
| 2019/0342904 | A1 | 11/2019 | Islam et al. |
| 2021/0251011 | A1* | 8/2021 | You ........................ H04W 16/26 |

FOREIGN PATENT DOCUMENTS

| | | |
|---|---|---|
| WO | 2017/116447 A1 | 7/2017 |
| WO | 2017/204702 A1 | 11/2017 |
| WO | 2019/246248 A1 | 12/2019 |

OTHER PUBLICATIONS

Abdzadeh-Ziabari et al. "Robust Timing and Frequency Synchronization for OFDM Systems", Ieee Transactions on Vehicular Technology, vol. 60, No. 8, Oct. 2011, 11 pages.

Guo et al., "A Novel Timing Synchronization Method for Distributed MIMO-OFDM System", 2006 IEEE, pp. 1933-1936.

Mochizuki et al., "A High Performance Frequency and Timing Synchronization Technique for Ofdm", IEEE 1998, pp. 3443-3448.

Non-Final Office Action received for U.S. Appl. No. 16/101,917 dated Mar. 24, 2020, 108 pages.

Schmidl et al., "Robust frequency and timing synchronization for OFDM." IEEE transactions on communications 45.12, Dec. 1997, 9 pages.

Zheng et al., "A novel timing and frequency synchronization scheme for MIMO OFDM system." Wireless Communications, Networking and Mobile Computing, WiCom 2007, International Conference, IEEE, 2007, 4 pages.

Wang et al., "Timing synchronization for MIMO-OFDM WLAN systems." Wireless Communications and Networking Conference, WCNC 2007, IEEE, 2007, 6 pages.

Non-Final Office Action received for U.S. Appl. No. 17/343,843 dated Sep. 1, 2022, 37 pages.

\* cited by examiner

OVER THE AIR SYNCHRONIZATION BY MEANS OF A PROTOCOL IN A NEXT GENERATION WIRELESS NETWORK

RELATED APPLICATION

The subject patent application is a continuation of, and claims priority to, U.S. patent application Ser. No. 16/101,917 (now U.S. Pat. No. 10,820,290), filed Aug. 13, 2018, and entitled "OVER THE AIR SYNCHRONIZATION BY MEANS OF A PROTOCOL IN A NEXT GENERATION WIRELESS NETWORK," the entirety of which application is hereby incorporated by reference herein.

TECHNICAL FIELD

The present application relates generally to the field of mobile communications and, for example, to establishing over the air synchronization of multi-hop integrated access and backhaul relay nodes using a precision time protocol in a next generation wireless network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
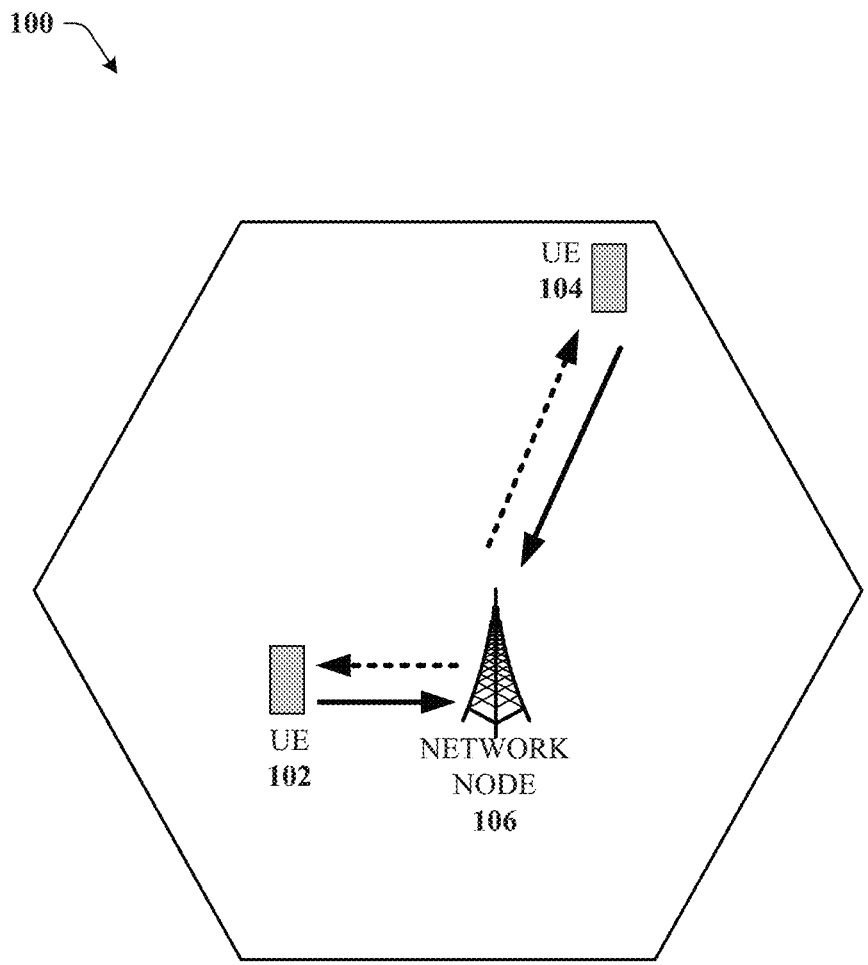
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for an integrated access and backhaul network with network nodes that can establish timing synchronization with other network nodes using a protocol. In an embodiment, network nodes in a multi-hop integrated access and backhaul network have a hop order of n, wherein n represents a number of hops from a node connected to the core network via a wired connection. In an embodiment, instead of using the network node with a hop order of 0 as the timing synchronization reference, any network node can use any other network node as a synchronization reference. In other words, no master nodes are configured that serve as the sole timing reference for the multi-hop network. A relay node can first establish a wireless link to said arbitrary node. Said wireless link is then used to synchronize the relay or IAB node using a Precision Time Protocol (PTP) implementation. Consequently, a node of hop order n seeking timing synchronization does not use any over-the-air waveforms other than from nodes of hop order n−1 unlike traditional radio interface base synchronization techniques where nodes of hop order n>0 all use over-the-air waveforms from a master node of hop order 0.

In various embodiments a network node device can comprise a processor and a memory that stores executable instructions that, when executed by the processor, facilitate performance of operations. The operations can include determining a node device to be synchronized in an integrated access and backhaul network. The operations can also include facilitating establishing the node device as a relay node device and the network node device as a donor node device via a first group of wireless transmissions, wherein the relay node device has a hop order of n+1 in the integrated access and backhaul network, wherein n represents a number of hops from a core network device, and wherein the donor node device has a hop order of n. The operations can also include facilitating synchronization of the relay node device via a second group of wireless transmissions.

In another embodiment, a method can include broadcasting, by a donor node device comprising a processor, a signal that comprises timing information and frequency information to facilitate establishing a communication channel with a relay node device. The method can also include facilitating, by the donor node device, receiving a random access channel transmission from the relay node device. The method can also include facilitating, by the donor node device, transmitting a random access channel response that facilitates establishing a node relationship with the relay node device, wherein the node relationship indicates that the relay node device has a hop order of n+1 in an integrated access and backhaul network, wherein n represents a number of hops to a node connected to the core network via a wired connection, and wherein the donor node device has a hop order of n. The method can also include facilitating, by the donor node device, transmitting a synchronization message to the relay node device to facilitate timing synchronization of the donor node device and the relay node device.

In another embodiment, a machine-readable storage medium can execute instructions that, when executed by a processor, facilitate performance of operations. The operations can include receiving a broadcast signal from a donor node device that comprises timing information and frequency information to facilitate establishing a communication channel with the donor node device. The operations can also include transmitting a random access channel request via the communication channel wherein the random access channel request facilitates establishing a node relationship with the donor node device, wherein the node relationship indicates that the relay node device has a hop order of n+1 in an integrated access and backhaul network, wherein n represents a number of hops to a node connected to the core network via a wired connection, and wherein the donor node device has a hop order of n. The operations can also include receiving a synchronization message from the donor node device, wherein the synchronization message facilitates timing synchronization of the donor node device and the relay node device.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, network node 106 can be part of an integrated access and backhaul network. This may allow easier deployment of a dense network of self-backhauled NR cells in a more integrated manner by building upon many of the control and data channels/procedures defined for providing access to UEs.

Figure 2:
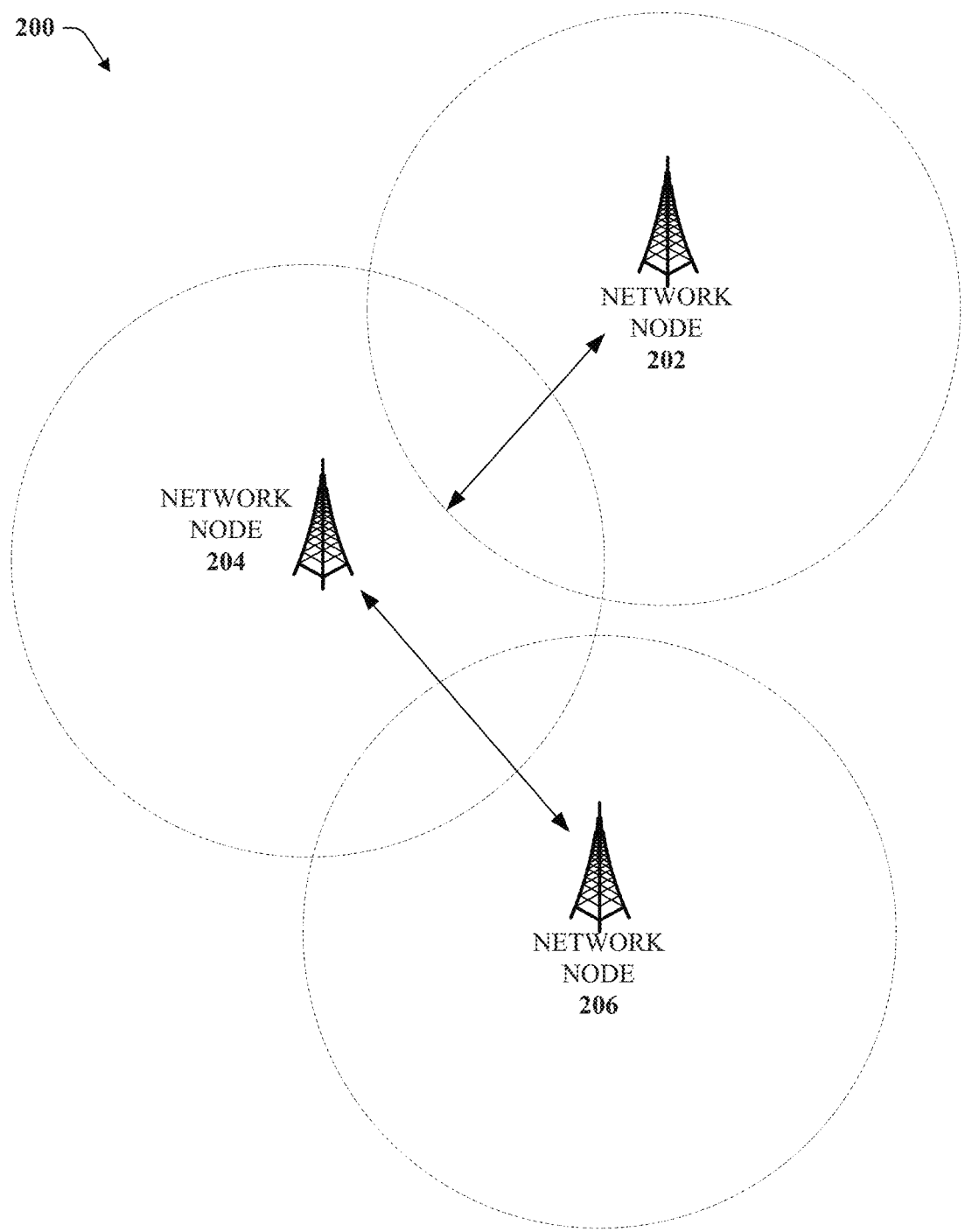
FIG. 2 illustrates an example multi-hop integrated access and backhaul network in accordance with various aspects and embodiments of the subject disclosure.

An example of an integrated access and backhaul network can be provided as shown in FIG. 2. FIG. 2 illustrates an example of a multi-hop integrated access and backhaul network 200 in accordance with various embodiments disclosed herein. In integrated access and backhaul network 200, there can be a donor node device 202 that is connected to a core network device (not pictured). The donor network node device 202 can be connected to the core network device via a physical backhaul connection in one or more embodiments. Network nodes 204 and 206, instead of being directly connected to the core network, can receive their backhaul connection via network node 202, and in the case of network node 206, via network node 204 as well. In various embodiments, the backhaul connection between one or more of network node devices 202, 204, or 206 can be provided via over the air interface).

In an embodiment, in an integrated access and backhaul network, the network node device 202 is said to be of hop order 0, network node 204 which connects to network node device 202 is said to be of hop order 1, and network node 206, which connects to network node device 204 has a hop order of 2. Each node of hop order n>0 connects to the core network via n wireless backhaul connections to the donor node.

In an embodiment, even when the backhaul link connecting network node 206 and network node 204 to network node 202 is provided via a physical backhaul, timing synchronization can still be performed via an over the air interface. This is due to the fact that occasionally, small latency and jitter of the cable connection cannot be guaranteed.

Furthermore, in traditional implementations, radio interface based synchronization (RIBS) techniques can be used to achieve over-the-air (OTA) timing synchronization. RIBS uses physical connections to backhaul data between each base station and the core network as well as air interface techniques for timing synchronization of each node. In particular, nodes are separated into masters (namely those base stations that can be used as a timing reference) and slaves (those nodes that need to acquire timing synchronization via said master nodes). For example, a master node may be a macro base station that is equipped with an GPS receiver whereas slave nodes may be small cell base stations that are deployed indoors in residential or enterprise premises. In particular, said small base stations may have Ethernet connectivity to the core network via a DSL cable with significant jitter/delay and moreover, due to their indoor location, may not use GPS for timing synchronization. For these nodes, RIBS can enable timing synchronization by means of reference or synchronization signals that are transmitted by a master node.

In the traditional implementation, the master node is always the node with hop order 0, e.g., network node device 202. RIBS based techniques are inefficient for multi-hop relay networks because only master nodes can be used as timing reference. Network node 204 will experience a better link quality to master node device 202 than network node 206 because of its proximity to network node 202. Generally, when RIBS based techniques are employed, the signal-to-interference-and-noise ratio (SINR) with which a slave node receives waveforms from a master node will degrade with increasing hop order. Hence, the system suffers from error propagation. In order to boost the SINR, RIBS based techniques may configure muting patterns among the transmissions of all base stations to increase the SINR of slave nodes of higher hop order. These muting patterns, however, while increasing the SINR of the RIBS deteriorate the overall spectral efficiency of the network.

To solve this problem, the disclosed over the air timing synchronization solution enables each network node to be a timing synchronization master node to any other node. Thus, network node 202 can serve as a master node for timing synchronization purposes for network node 204, and then network node 204 can serve as a master node for timing synchronization for network node 206.

The network node will first establish a wireless link to said arbitrary node. Said wireless link is then used to synchronize the relay or IAB node using a Precision Time Protocol (PTP) implementation. Consequently, a node of hop order n seeking timing synchronization does not use any over-the-air waveforms other than from nodes of hop order n−1 unlike RIBS techniques where nodes of hop order n>0 all use over-the-air waveforms from a master node of hop order 0.

Because any node can serve as timing reference, no muting patterns are needed thereby obviating the need for muting patterns which increases spectral efficiency of the system. Likewise, the SINR is always better than in RIBS based techniques because over-the-air synchronization is always based on a single hop rather than multiple hops.

Figure 3:
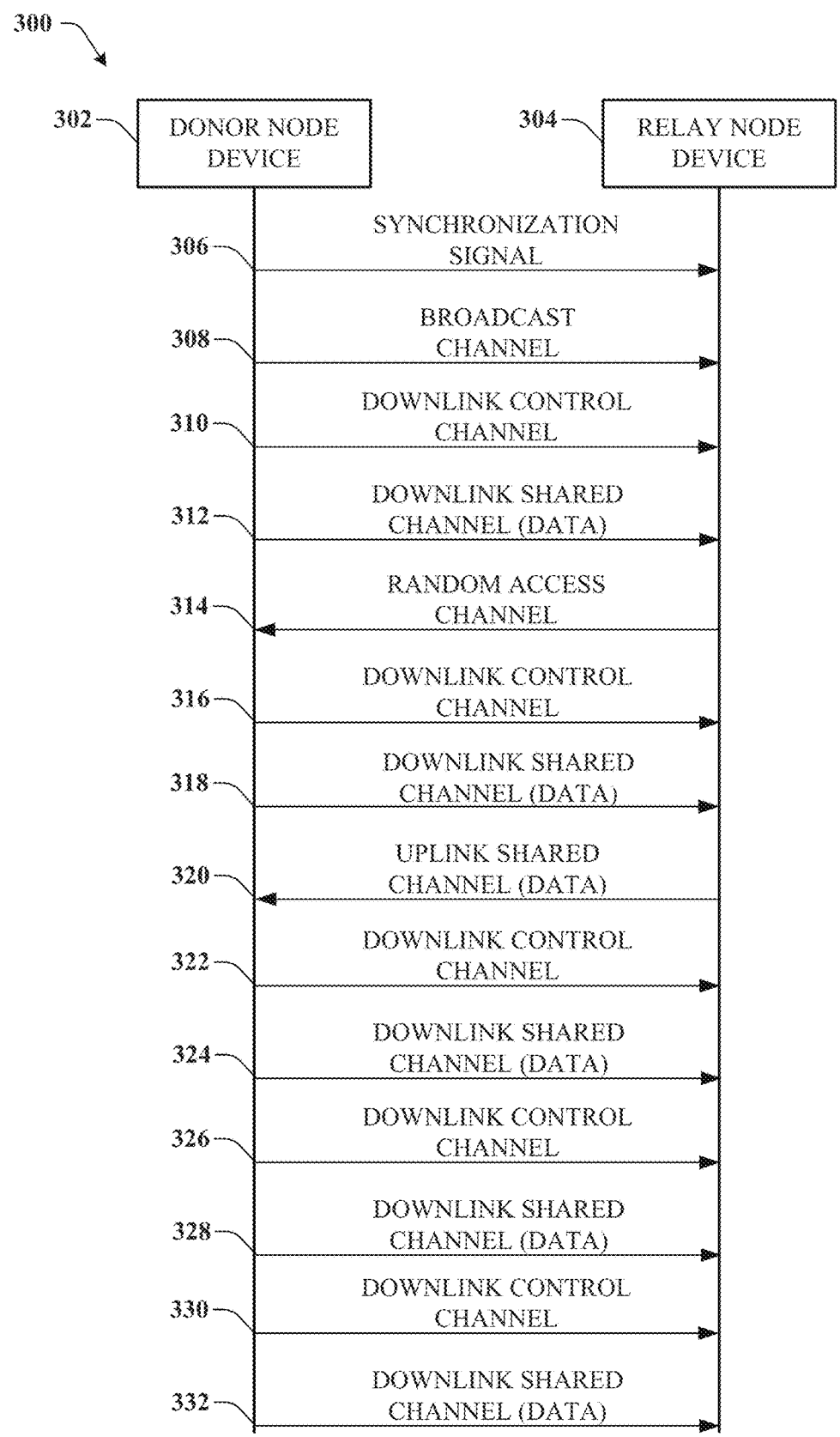
FIG. 3 illustrates an example message sequence chart for establishing timing synchronization in accordance with various aspects and embodiments of the subject disclosure.

Turning now to FIG. 3, illustrated is an example message sequence chart 300 for establishing timing synchronization in accordance with various aspects and embodiments of the subject disclosure.

In an embodiment, a donor node device 302 can establish a donor/relay node relationship with relay node device 304 through a sequence of messages sent in between the devices in order to implement the Precision Time Protocol (PTP) via the over the air interface. The donor node device 302 is a node of hop order n−1, whereby relay node 304 is a relay node of hop order n.

In an embodiment, at 306, donor node device 302 transmits a synchronization signal to relay node device 304. The synchronization signal 306 enables the relay node device 304 to obtain coarse time and frequency synchronization for reception of the broadcast channel 308 transmitted by donor node device 302. The payload of the broadcast channel transmission 308 enables relay node device 304 to receive remaining system information (RMSI) scheduled by physical downlink control channel (PDCCH) transmission 310 and transmitted by the physical downlink shared channel (PDSCH) transmission 312.

The payload of 312, namely, parts of the RMSI, enable relay node device 304 to initiate a random access procedure by transmitting a physical random access channel transmission 314 to donor node device 302. Donor node device 302 responds to the physical random access channel transmission 314 with a random access response (RAR) scheduled by physical downlink control channel (PDCCH) transmission 316 and transmitted by the physical downlink shared channel (PDSCH) transmission 318. Amongst others, the random access response 318 includes information for relay node device 304 to transmit a message on the physical uplink shared channel (PUSCH) transmission 320.

Physical downlink shared channel (PDSCH) transmission 324 is scheduled by physical downlink control channel (PDCCH) transmission 322 and may serve the purpose of contention resolution, if necessary. After contention resolution, one or more PDCCH 326 and PDSCH 328 transmissions may configure the relay node device 304 as relay or IAB node. Subsequently, one or more PDCCH 330 and PDSCH 332 transmissions may configure a precision timing protocol (PTP) between relay node device 304 and a PTP master clock associated with donor node device 302.

In an embodiment, donor node device 302 may configure relay node device 304 via a timing advance (TA) command to shift its transmission time in order to guarantee radio frame boundary alignment between the two base station devices according to some criteria. For example, donor node device 302 may configure relay node device 304 such that their respective radio frame boundaries are within a given accuracy of, for instance, 3 microseconds. In addition, relay node device 304 may continuously monitor waveform transmissions by donor node device 302 to autonomously correct its radio frame boundary timing according to some criteria.

The precision timing protocol established between relay node device 304 and some master clock associated with donor node device 302 allows to establish a global timing reference in the network 200. In particular, relay node device 304 may be an implementation of the network node 206 and donor node device 302 may be an implementation of the network node 204. The PTP exchanges messages with relay node device 304 via PDSCH and PUSCH transmissions sent/received by donor node device 302 in order to establish sub-microsecond synchronization among nodes of network 200.

Scheduling, quality-of-service (QoS) control and route management can ensure that PTP packets are delivered to relay node device 304 with low latency and high reliability. For example, donor node device 302 may adjust the frame structure (namely, which subframes can be used to transmit and receive, respectively) or PDSCH/PUSCH transmission durations for that purpose. In addition to a PTP master clock, boundary clocks may be used at one or more network node device within the exemplary network 200. As an example, if network node 204 or network node 206 comprise a GPS receiver, they may serve as a boundary clock and serve as the root timing reference and can thus improve overall synchronization accuracy. The root timing reference (grandmaster) may be located within the radio access network (e.g., base station 204 or 206) or within the core network.

Figure 4:
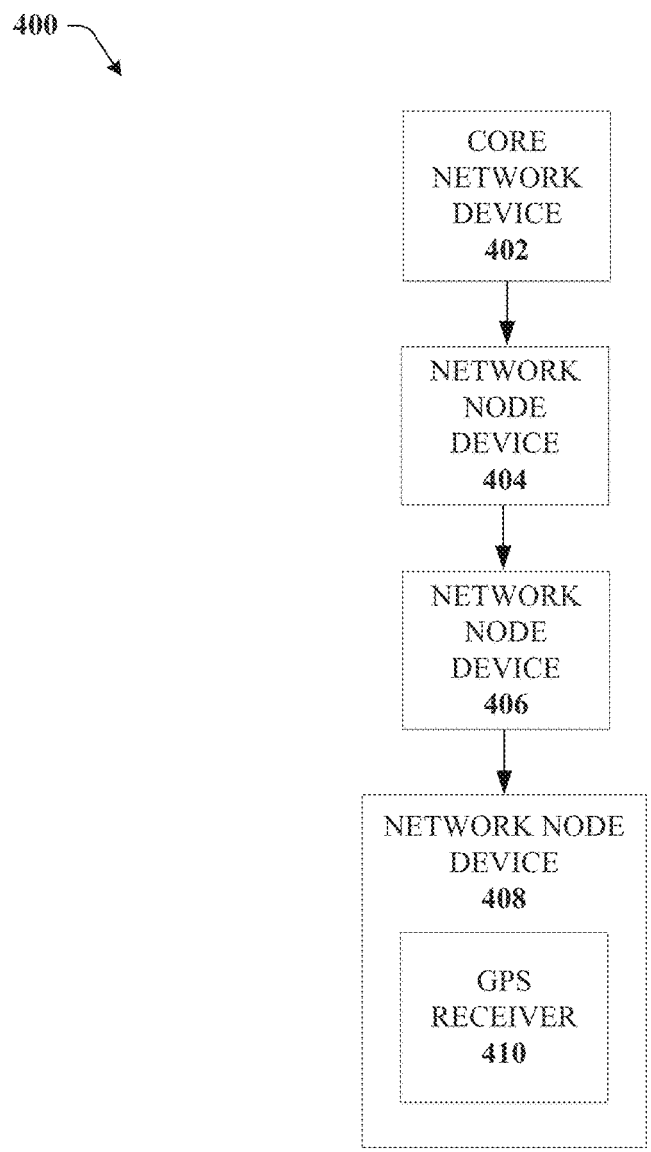
FIG. 4 illustrates an example multi-hop integrated access and backhaul network in accordance with various aspects and embodiments of the subject disclosure.

Turning now to FIG. 4, illustrated is an example multi-hop integrated access and backhaul network in accordance with various aspects and embodiments of the subject disclosure.

In an embodiment, a core network device 402 can be connected to a network node device 404 that serves as a donor node for network node device 406 and serves as a master node with regards to over-the-air timing synchronization for network node device 406. Network node device 406, can in turn, also serve as a master node for over-the-air timing synchronization for network node 408. Network node device 408 does not have to use network node 404 as a timing reference, and can instead use the closer network node device 406, and avoid issues with low SINR, and propagation losses. In an embodiment, network node device 408 can have a GPS receiver 410 which can be used a master timing reference to improve synchronization within the network.

Figure 5:
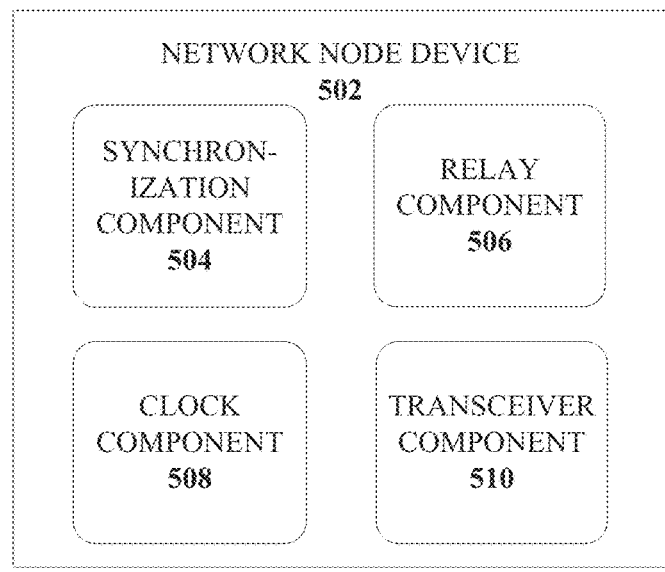
FIG. 5 illustrates an example block diagram of a network node device that can establish timing synchronization with another network node device in accordance with various aspects and embodiments of the subject disclosure.

Turning now to FIG. 5, illustrated is an example block diagram 500 of a network node device 502 that can establish timing synchronization with another network node device in accordance with various aspects and embodiments of the subject disclosure. In an embodiment, network node device can both serve as a relay node, receiving timing synchronization from a donor node device elsewhere, and likewise, also serve as a donor node device for another network node device of a higher hop order.

Network node device 502 can include a relay component 506 that can facilitate establishing a relay/donor node relationship by managing the issuance of the messages and signals depicted in FIG. 3. Relay component 506 can determine whether the device 502 is to act as a relay node (e.g., slave device) or a donor node (e.g., master device) with respect to the synchronization protocol. Once the relationship is established, synchronization component 504 can perform the synchronization according to the Precision Timing Protocol, and can determine the adjustment of the frame structure, issuing or applying a received timing advance, and other synchronization functionality. In an embodiment, the clock component 508 can be used as a master clock, or can be adjusted based on the synchronization process, and transceiver component 510 can facilitate sending the messages relating to establishing the donor/relay relationship and timing synchronization.

Figure 6:
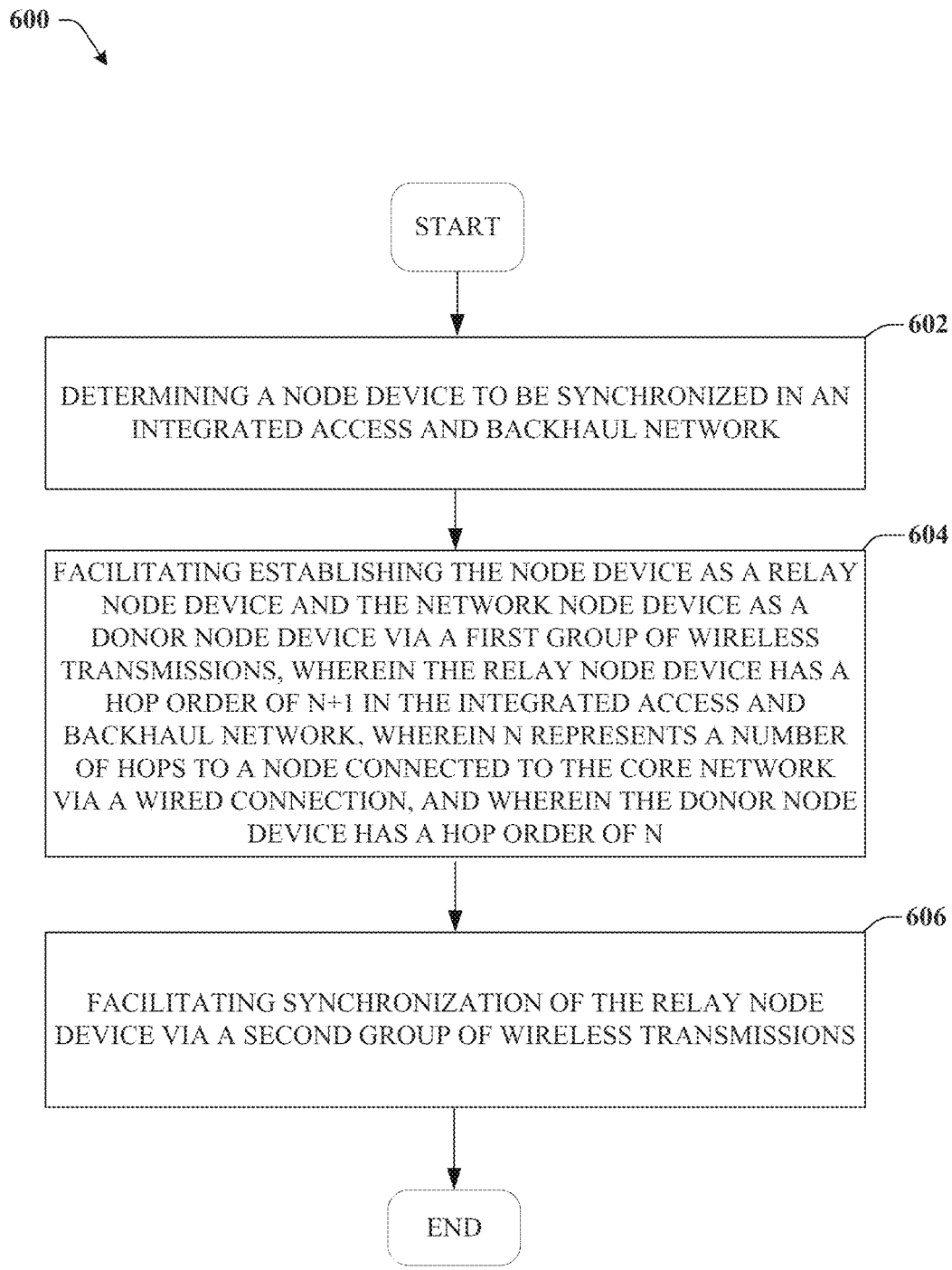
FIG. 6 illustrates an example method for establishing timing synchronization in an integrated access and backhaul network in accordance with various aspects and embodiments of the subject disclosure.
Figure 7:
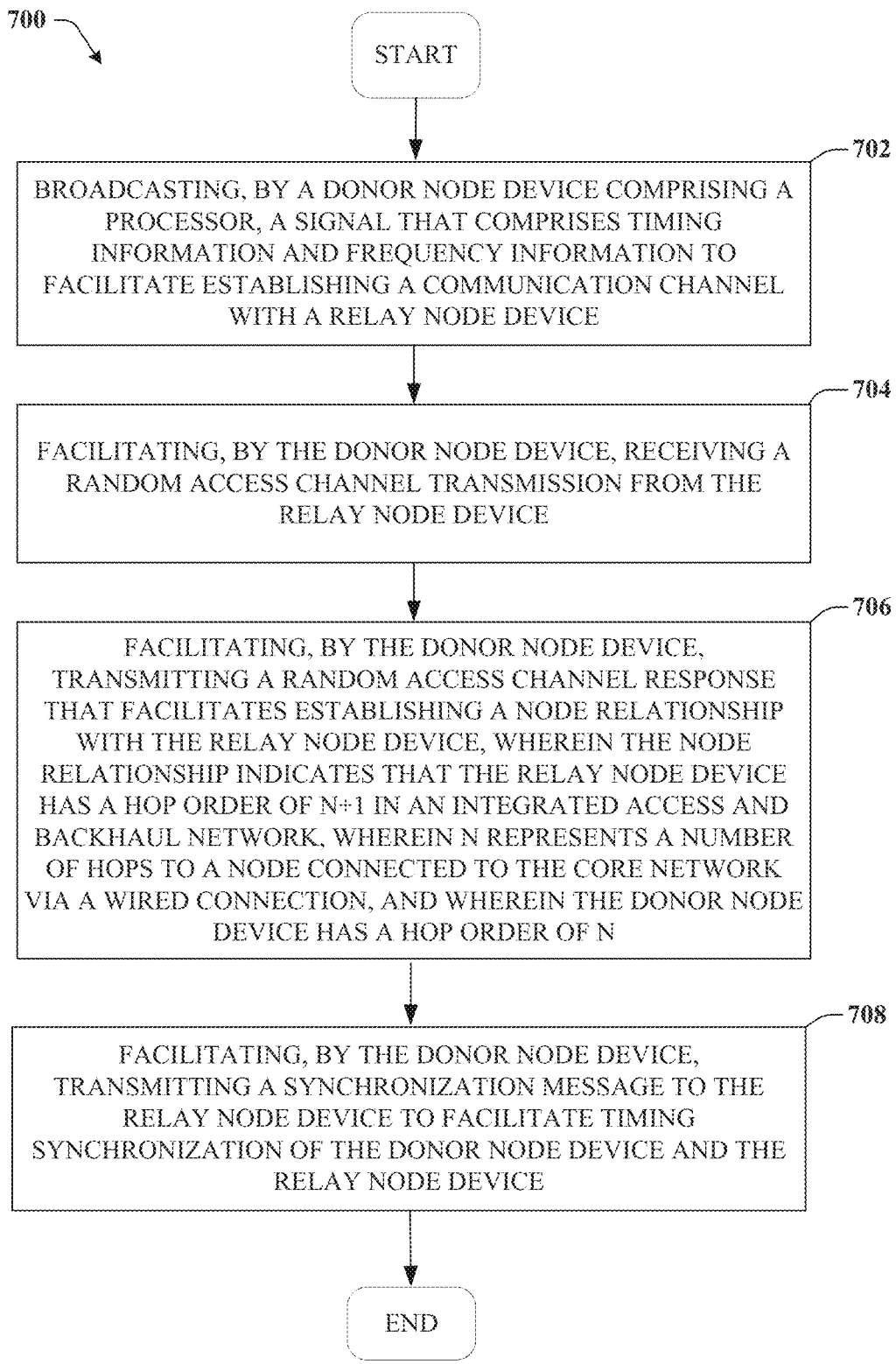
FIG. 7 illustrates an example method for establishing timing synchronization in an integrated access and backhaul network in accordance with various aspects and embodiments of the subject disclosure.
Figure 8:
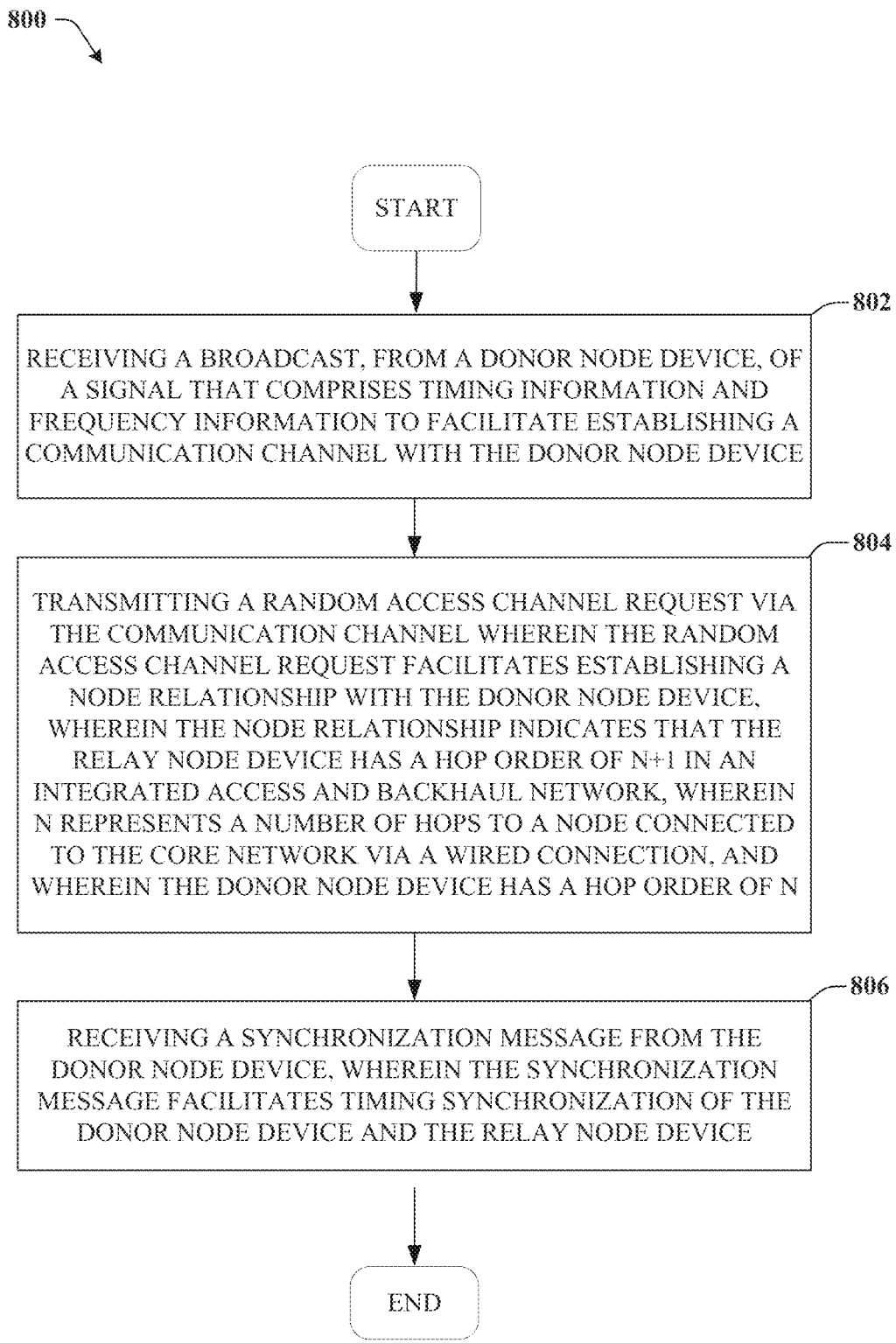
FIG. 8 illustrates an example method for establishing timing synchronization in an integrated access and backhaul network in accordance with various aspects and embodiments of the subject disclosure.

FIGS. 6-8 illustrate a process in connection with the aforementioned systems. The processes in FIGS. 6-8 can be implemented for example by the systems in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 6 illustrates an example method 600 for establishing timing synchronization in an integrated access and backhaul network in accordance with various aspects and embodiments of the subject disclosure.

Method 600 can begin at 602 where the method includes determining a node device to be synchronized in an integrated access and backhaul network.

At 604, the method includes facilitating establishing the node device as a relay node device and the network node device as a donor node device via a first group of wireless transmissions, wherein the relay node device has a hop order of n+1 in the integrated access and backhaul network, wherein n represents a number of hops to a node connected to the core network via a wired connection, and wherein the donor node device has a hop order of n.

At 606, the method includes facilitating synchronization of the relay node device via a second group of wireless transmissions.

FIG. 7 illustrates an example method 700 for establishing timing synchronization in an integrated access and backhaul network in accordance with various aspects and embodiments of the subject disclosure.

Method 700 can begin at 702 where the method includes broadcasting, by a donor node device comprising a processor, a signal that comprises timing information and frequency information to facilitate establishing a communication channel with a relay node device.

At 704, the method includes facilitating, by the donor node device, receiving a random access channel transmission from the relay node device.

At 706, the method includes facilitating, by the donor node device, transmitting a random access channel response that facilitates establishing a node relationship with the relay node device, wherein the node relationship indicates that the relay node device has a hop order of n+1 in an integrated access and backhaul network, wherein n represents a number of hops to a node connected to the core network via a wired connection, and wherein the donor node device has a hop order of n.

At 708, the method includes facilitating, by the donor node device, transmitting a synchronization message to the relay node device to facilitate timing synchronization of the donor node device and the relay node device.

FIG. 8 illustrates an example method 800 for establishing timing synchronization in an integrated access and backhaul network in accordance with various aspects and embodiments of the subject disclosure.

Method 800 can begin at 802 where the method includes receiving a broadcast, from a donor node device, of a signal that comprises timing information and frequency information to facilitate establishing a communication channel with the donor node device.

At 804, the method includes transmitting a random access channel request via the communication channel wherein the random access channel request facilitates establishing a node relationship with the donor node device, wherein the node relationship indicates that the relay node device has a hop order of n+1 in an integrated access and backhaul network, wherein n represents a number of hops to a node connected to the core network via a wired connection, and wherein the donor node device has a hop order of n.

At 806, the method includes receiving a synchronization message from the donor node device, wherein the synchronization message facilitates timing synchronization of the donor node device and the relay node device.

Figure 9:
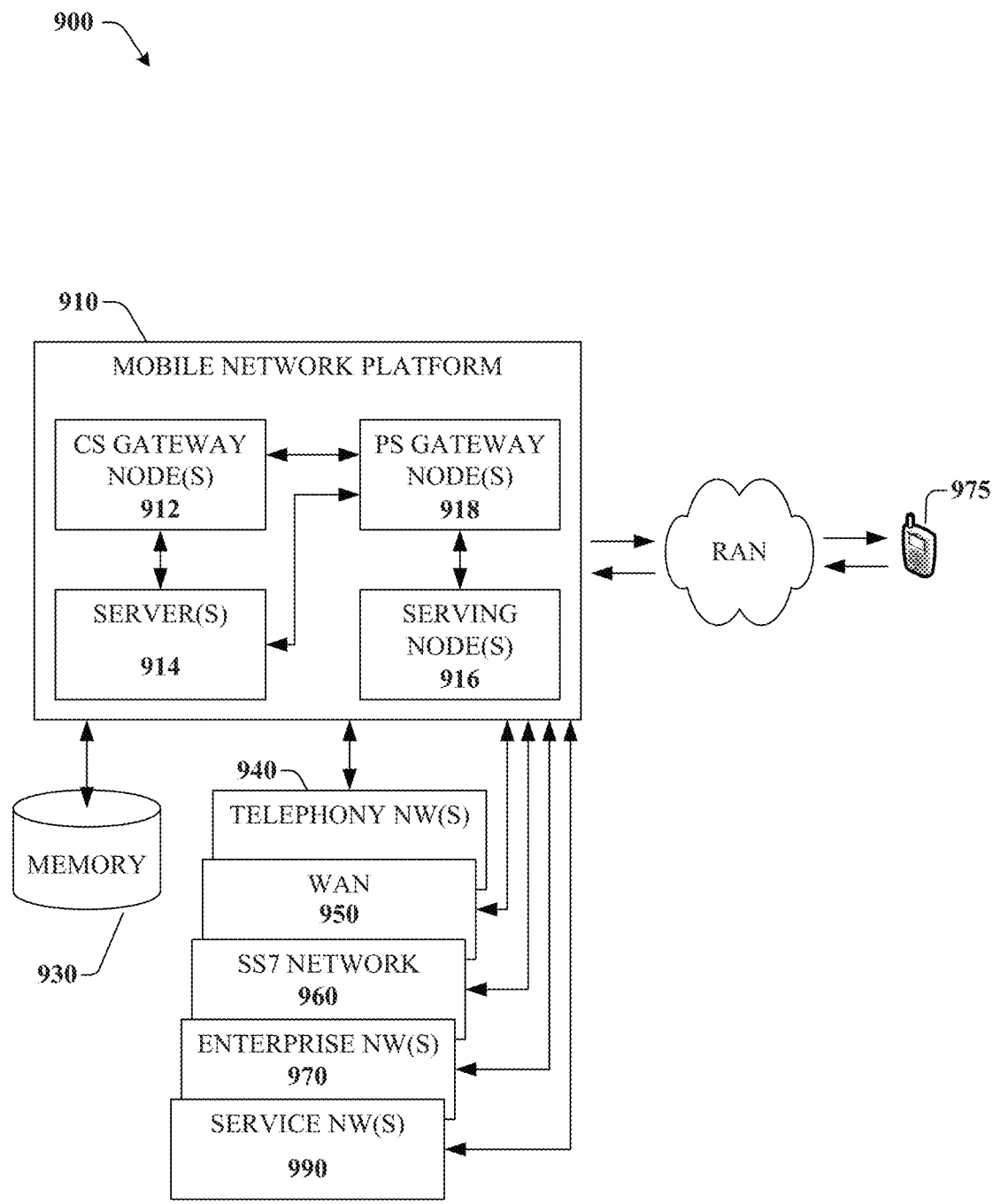
FIG. 9 illustrates an example block diagram of an example mobile network platform in accordance with various aspects and embodiments of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 830 can store information related to operation of wireless network platform 810. Other operational information can include provisioning information of mobile devices served through wireless platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
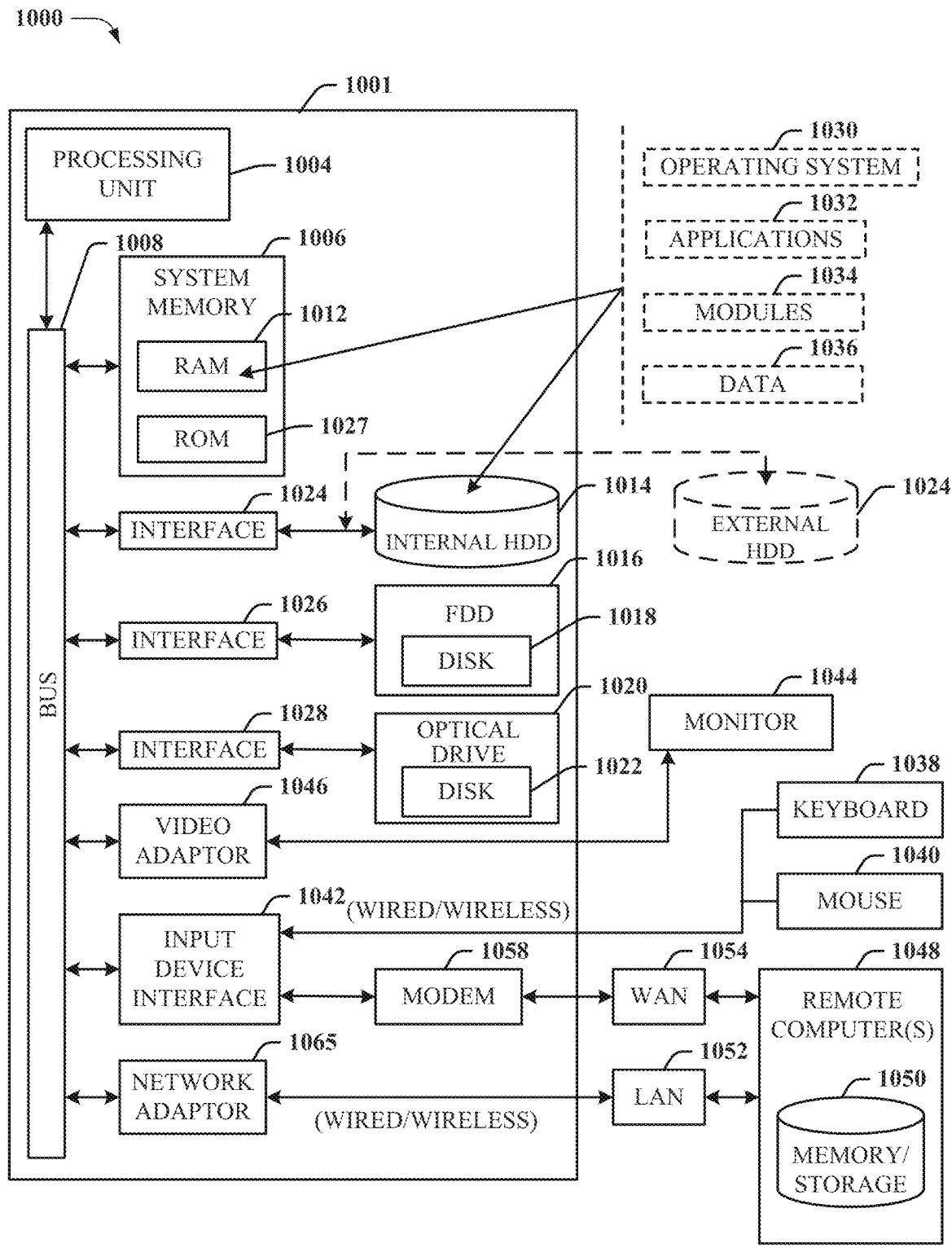
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network nodes 106, 202, 204, 206. 302, 304, 502, and e.g.,) may contain components as described in FIG. 10. The computer 1000 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. Relay node equipment, comprising:
a processor; and
a memory that stores executable instructions that, when executed by the processor, facilitate performance of operations, comprising:
receiving, from donor node equipment, a first physical downlink control channel transmission and a first physical downlink shared channel transmission to configure the relay node equipment as a relay node; and
receiving, from the donor node equipment, a second physical downlink control channel transmission and a second physical downlink shared channel transmission to configure a timing protocol between the relay node equipment and the donor node equipment, wherein the timing protocol being performed comprises reception of a synchronization message from the donor node equipment, and wherein the synchronization message facilitates timing synchronization of the donor node equipment and the relay node equipment.

2. The relay node equipment of claim 1, wherein the operations further comprise receiving a broadcast, from the donor node equipment, of a signal that comprises timing information and frequency information to facilitate establishing a communication channel with the donor node equipment.

3. The relay node equipment of claim 2, wherein the operations further comprise transmitting a random access channel request via the communication channel, wherein the random access channel request facilitates establishing a node relationship with the donor node equipment, wherein the node relationship indicates that the relay node equipment has a hop order of n+1 in an integrated access and backhaul network, wherein n represents a number of hops to a node connected to core network equipment via a wired connection, and wherein the donor node equipment has a hop order of n.

4. The relay node equipment of claim 1, wherein the operations further comprise receiving, from the donor node equipment, a timing advance command to shift a relay node equipment transmission time for radio frame boundary alignment between the donor node equipment and the relay node equipment.

5. The relay node device of claim 1, wherein the operations further comprise monitoring waveform transmissions from the donor node equipment and, based on the monitoring, correcting radio frame boundary timing at the relay node equipment.

6. A method, comprising:
facilitating, by a first node device comprising a processor, establishing a node relationship with a second node device as a relay node device and the first node device as a donor node device via wireless transmissions, the wireless transmissions comprising:
a broadcast channel transmission that enables the relay node device to receive remaining system information, wherein the remaining system information enables the relay node device to initiate a random access procedure with the donor node device;
a first physical downlink control channel transmission and a first physical downlink shared channel transmission to configure the relay node device as a relay node; and
a second physical downlink control channel transmission and a second physical downlink shared channel transmission to configure a timing protocol between the relay node device and the donor node device; and
facilitating, by the donor node device, a wireless backhaul connection on behalf of the relay node device, wherein the wireless backhaul connection is synchronized according to the timing protocol.

7. The method of claim 6, wherein the donor node device has a hop order of n, wherein the relay node device has a hop order of n+1 in an integrated access and backhaul network, and wherein n represents a number of hops to a node connected to a core network device via a wired connection.

8. The method of claim 6, wherein the wireless transmissions further comprise a synchronization signal that enables the relay node device to receive the broadcast channel transmission.

9. The method of claim 8, wherein the wireless transmissions comprise a first group of wireless transmissions and a second group of wireless transmissions, wherein the first group of wireless transmissions comprises the synchronization signal, the broadcast channel transmission, the first physical downlink control channel transmission and the first physical downlink shared channel transmission, and wherein the second group of wireless transmissions comprises the second physical downlink control channel transmission and the second physical downlink shared channel transmission.

10. The method of claim 6, wherein the random access procedure comprises:
receiving, by the donor node device, a random access channel transmission from the relay node device; and
transmitting, by the donor node device, a random access channel response to the relay node device.

11. The method of claim 6, further comprising configuring, by the donor node device, a transmission of remaining system information via the first physical downlink control channel transmission.

12. The method of claim 6, wherein the wireless transmissions further comprise a timing advance command message.

13. The method of claim 6, further comprising:
adjusting, by the donor node device, a frame structure for a future transmission to the relay node device; and
transmitting, by the donor node device, an indication of the adjusting to the relay node device.

14. A non-transitory machine-readable medium, comprising executable instructions that, when executed by a processor of donor node equipment, facilitate performance of operations, comprising:
facilitating transmitting a first physical downlink control channel transmission and a first physical downlink shared channel transmission to configure relay node equipment as a relay node; and
facilitating transmitting a second physical downlink control channel transmission and a second physical downlink shared channel transmission to configure a timing protocol between the relay node equipment and the donor node equipment, wherein the timing protocol comprises transmitting a synchronization message to the relay node equipment to facilitate timing synchronization of the donor node equipment and the relay node equipment.

15. The non-transitory machine-readable medium of claim 14, wherein the operations further comprise broadcasting a signal that comprises timing information and frequency information to facilitate establishing a communication channel with the relay node equipment.

16. The non-transitory machine-readable medium of claim 14, wherein the operations further comprise facilitating receiving a random access channel transmission from the relay node equipment.

17. The non-transitory machine-readable medium of claim 14, wherein the facilitating of the receiving the random access channel transmission is in response to facilitating transmitting remaining system information on a physical downlink shared channel to the relay node equipment.

18. The non-transitory machine-readable medium of claim 14, wherein the operations further comprise configuring a transmission of remaining system information via a broadcast channel and a downlink control channel.

19. The non-transitory machine-readable medium of claim 14, wherein the operations further comprise facilitating transmitting a random access channel response that facilitates establishing a node relationship with the relay node equipment, wherein the node relationship indicates that the relay node equipment has a hop order of n+1 in an integrated access and backhaul network, wherein n represents a number of hops to a node connected to equipment associated with a core network via a wired connection, and wherein the donor node equipment has a hop order of n.

20. The non-transitory machine-readable medium of claim 14, wherein the operations further comprise:

adjusting a frame structure for a future transmission to the relay node equipment; and transmitting an indication of the adjusting to the relay node equipment.

* * * * *